United States Patent [19]

Pollock

[11] 4,456,487
[45] Jun. 26, 1984

[54] METHOD FOR CLEANING AND ANNEALING A THERMOLUMINESCENT RADIATION DETECTOR CRYSTAL

[75] Inventor: Robert W. Pollock, Aurora, Ill.

[73] Assignee: Siemens Gammasonics, Inc., Des Plaines, Ill.

[21] Appl. No.: 386,969

[22] Filed: Jun. 10, 1982

[51] Int. Cl.³ ............................................. B08B 11/00
[52] U.S. Cl. ........................................ 134/31; 134/40; 250/473.1; 250/484.1; 252/301.4 R; 252/301.4 H; 252/301.4 S
[58] Field of Search ........................... 134/25.4, 31, 40; 250/473.1, 484.1; 252/301.4 R, 301.4 H, 301.4 S; 432/197; 34/26

[56] References Cited

U.S. PATENT DOCUMENTS

| | | | |
|---|---|---|---|
| 2,550,173 | 4/1951 | Swinehart et al. | 423/178 |
| 3,414,423 | 12/1968 | Fierke et al. | 134/31 |
| 3,437,521 | 4/1969 | Buist | 134/31 X |
| 3,516,861 | 6/1970 | Menkes et al. | 134/25.4 X |
| 3,590,245 | 6/1971 | Oonishi et al. | 250/484.1 |
| 3,790,784 | 2/1974 | Webb et al. | 250/473.1 X |
| 3,904,102 | 9/1975 | Chu et al. | 134/31 X |

OTHER PUBLICATIONS

Nuclear Instruments & Methods 141 (1977) 363–368.
Phys. Med. Biol., 1981, vol. 26, No. 4 765–824.
Nuclear Instruments and Methods 155 (1978), 299–304.
25th Annual Health Physics Society Meeting, Seattle, Washington, Jul. 21–25, 1980.
D. E. Lancaster "Thermoluminescence: Theory & Applications", *Electronics World,* Mar. 1969.
"TLD Materials Summary" Sep. 1977.
Medical Physics Handbook No. 5, Chapter "Thermoluminescence Dosimetry" by A. F. McKinlay, p. 138.

*Primary Examiner*—Marc L. Caroff
*Attorney, Agent, or Firm*—Karl F. Milde, Jr.

[57] ABSTRACT

A thermoluminescent radiation detector crystal which has been irradiated by ionizing radiation is contacted with an organic solvent at its boiling point prior to read-out of the crystal. The boiling point of the solvent is approximately equal to the optimum post-radiation annealing temperature of the crystal. The solvent thereby simultaneously cleans and anneals the crystal. Preferably, the contacting step is performed by suspending the crystal in vapors of the solvent. The vapor condenses on the crystal and washes away impurities from the surface thereof.

12 Claims, 3 Drawing Figures

METHOD FOR CLEANING AND ANNEALING A THERMOLUMINESCENT RADIATION DETECTOR CRYSTAL

BACKGROUND OF THE INVENTION

1. Technical Field of the Invention

This invention relates to a method for processing a thermoluminescent crystalline material, in particular a thermoluminescent radiation detector crystal. Still more particular, this invention relates to a method for processing irradiated crystalline material used in a thermoluminescence dosimeter badge. This invention also relates to an apparatus for processing such crystalline material.

2. Description of the Prior Art

It is well known to use radiation detector crystalline material such as calcium fluoride crystals or lithium fluoride crystals containing imperfections as radiation detector crystals in thermoluminescence dosimeter (TLD) badges. For instance, such badges are used to measure the exposure of the wearer thereof to ionizing radiation, such as gamma or beta radiation. Such radiation detector crystals are also used for environmental radiation monitoring, in particular for measuring low level radiation. After a certain exposure time, the radiation detector crystals are examined or read-out in order to determine the degree to which the wearer or the environment has been exposed to the radiation.

Thermoluminescence is the release of light in a crystalline material as it is heated at a predetermined rate. The light is a function of or even proportional to the previous nuclear radiation dosage which the crystalline material has received. Once the light is produced, the previous radiation history of the material is "erased" as the thermal cycling performs a destructive read-out of the sample's past history, see e.g. D. E. Lancaster "Thermoluminescence: Theory & Applications", *Electronics World*, March 1969.

Thermoluminescence can only be observed if the crystalline detector material has imperfections such as impurities locked in its lattice structures, or mechanical structure defects. These imperfections constitute electron traps. Popular dosimetry materials are, among others, calcium fluoride, calcium sulfate, lithium borate, lithium fluoride, and potassium sulfate (see: *Electronics World*, supra). The alkali halide lithium fluoride is frequently applied in dosimetry since it thermoluminesces brightly, is chemically stable, reasonably non-toxic, and easily formed into bar, rod, disk or powder. The impurities or activators which are purposely introduced into lithium fluoride in order to increase the number of electron traps are trace quantities of e.q. maqnesium, terbium, europium, or other rare-earth elements. A variety of TLD materials is described in the "TLD Materials Summary", September 1977, by The Harshaw Chemical Company, Solon, Ohio, U.S.A.

In the read-out step the crystals are heated at a constant rate, and a light vs. temperature curve called glow curve may be obtained. The glow curve has glow peaks that correspond to different energy-level traps.

While one should attempt to keep crystals clean, some dust or grease may become attached to them. It is important that this is removed before it is permanently burned into the surface (see e.g. *Medical Physics Handbook No. 5*, chapter "Thermoluminescence Dosimetry" by A. F. McKinlay (Adam Hilger, 1981), p. 138).

Before the actual read-out procedure, the crystals are usually annealed. It has been found for many TLD crystals that the anneal is necessary to reduce fading errors. For instance, for $CaSO_4:Dy$ it has been found that due to the presence of low-temperature peaks in the glow curve, a postirradiation anneal ($T^* = 100°$ C., $t^* = 10$ min) or a preheat incorporated into the reading cycle is definitely required; see review article "The Theoretical and Microdosimetric Basis of Thermoluminescence and Applications to Dosimetry", *Phys. Med. Biol.*, 1981, Vol. 26, No. 4, 765–824, esp. p. 776. The effect of annealing has been thoroughly examined in the past (see e.g. B. Burgkhardt and E. Piesch, "The Effect of Post-Irradiation Annealing on the Fading Characteristic of Different Thermoluminescent Materials, Part II-Optimal Treatment and Recommendations", *Nuclear Instruments and Methods* 155 (1978),299–304). The optimum annealing temperature $T^*$ and the optimum annealing time $t^*$ have been established for many materials, for instance for $6LiF:Mg$ dosed with thermal neutrons $T^* = 60°$ and $t^* = 18h$ (see R. B. Luersen and T. L. Johnson, "Optimum Over-night Annealing Temperature for LiF:Mg", presented at the *25th Annual Health Physics Society Meeting*, Seattle, Washington, July 21–25, 1980), and for CaF and $CaSO_4$ the temperature $T^*$ is 100° C. and the time $t^*$ is between 10 and 25 minutes; (see B. Burghardt, D. Singh, E. Piesch, "High-Dose Characteristics of $CaF_2$ and $CaSO_4$ Thermoluminescent Dosimeters", *Nuclear Instruments and Methods* 141(1977), p. 363–368, in particular table 1.

At the present time, TLD crystals are conventionally cleaned with an organic solvent (see "Medical Physics Handbook, No. 5", supra). Then, in a separate step before read-out, they are annealed in an oven. In particular, lithium fluoride crystals are cleaned with warm trichloroethylene and/or a methanol rinse, and the clean crystals are subsequently heated in a 100° C. oven for approximately 10 minutes (Communication of the Harshaw Chemical Company, Solon, Ohio, U.S.A.). The temperature of 100° C. is the optimum annealing temperature of lithium fluoride crystals. Thereafter, the lithium fluoride crystals are read out.

It has been found that this two-step procedure of cleaning and annealing in a separate oven is time consuming and expensive.

SUMMARY OF THE INVENTION

1. Objects

It is an object of this invention to provide a method for processing a radiation detector crystal which method is less time consuming than previously used methods.

It is another object of this invention to provide a method for processing the crystal used in a TLD badge which method is simplified with respect to previously used methods.

It is still another object of this invention to provide a crystal processing method which provides consistent results.

It is still another object of this invention to provide an apparatus for a combined cleaning and annealing process of crystals.

2. Summary

According to this invention, a method for processing a radiation detector crystal which has been irradiated by ionizing radiation is provided. This method comprises the step of exposing the crystal to a solvent whose boiling point is at least approximately the optimum annealing temperature of that crystal, said solvent thereby cleaning and annealing the crystal simultaneously. In other words, the new procedure combines the cleaning and annealing stages by exposing the radiation detector crystal to a solvent of a specific temperature. Thus, a specific handling of the crystal between the cleaning and the annealing steps is eliminated. This saves working time, and the process is less expensive.

In a preferred embodiment, the crystal is suspended in a vapor bath of the solvent, in particular of an organic solvent, whose boiling point is the same or approximately the same as the optimum annealing temperature of the crystal. The crystal is thus heated to the appropriate temperature and left in the vapor bath long enough to be annealed. The vapor also condenses out of the crystal, thereby cleaning the crystal with the pure solvent.

The appropriate annealing temperature and the appropriate annealing time will vary from one kind of radiation detector crystal to another. The appropriate values can be found in the literature, for instance in the literature cited above.

The terms "crystalline material" and "crystal" as used herein are intended to comprise various physical forms, including bars, rods, disks, ribbons, cards, and powder.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
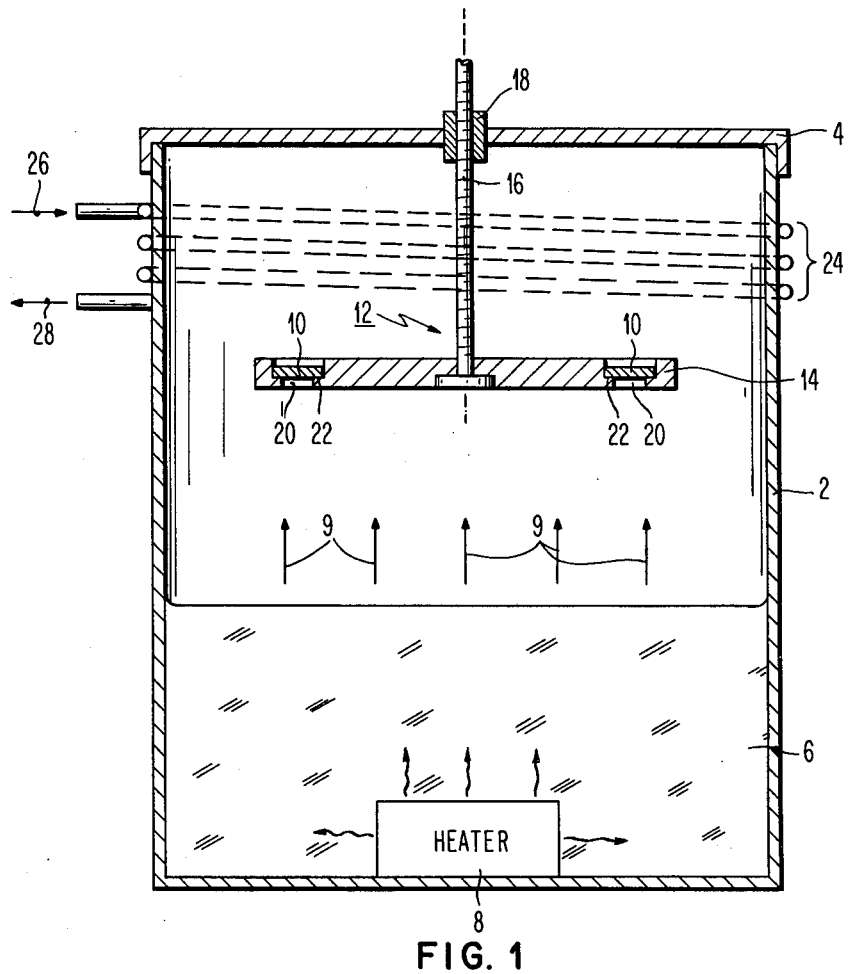
FIG. 1 is a cross sectional view of an apparatus for performing simultaneously a cleaning and an annealing procedure according to the invention.

With reference to FIG. 1, an example of an apparatus for performing simultaneously a cleaning and an annealing process in individual crystals is illustrated. The apparatus contains a housing which is comprised of a container 2 such as a large beaker, and a lid or cover 4. The lower portion of the container 2 is filled with an organic solvent 6. The solvent 6 can be heated up to its boiling point by means of an immersion heater 8. In particular, the heater 8 may be an electric heater which is attached to the bottom of the container 2. The conventional electrical connection lines are not shown. Evaporation of the solvent 6 is indicated by arrows 9.

In the upper portion of the container 2, a given number of crystals 10 are exposed to the vapor of the solvent 6. For this purpose, a holding device or hanging support 12 is provided. The evaporated solvent 6 reaches a large portion of the surface of the crystals 10. In the illustrated embodiment, the hanging support or holder 12 contains a disk 14 which is supported by a rod 16. The rod 16 projects into the interior of the container 2 through a sleeve or bushing 18 which is provided in the central portion of the cover 4. The disk 14 preferably may be a metal disk. It contains a number of holes 20 equally distributed at its circumference. Each of the holes 20 is provided with an annular shoulder 22 on which the respective crystal 10 rests. Thus, both sides of the crystals 10 are exposed to the vapor in the upper portion of the container 2.

In particular, the disk 14 may be a well-known disk which is conventionally used for read-out. Such a read-out takes place after the cleaning and annealing process in the illustrated apparatus. This feature of using the same disk 14 for cleaning, annealing and reading-out saves time and work since it is not necessary to insert clean crystals cautiously into the read-out disk of the read-out device (not shown).

In order that condensation of the evaporized solvent 6 takes place in the upper portion of the container 2, a cooling coil 24 is provided. This cooling coil 24 is wound around the upper portion of the container 2. The cooling medium entering the coil 24, is designated by an arrow 26, and the coolant leaving the coil 24 is designated by an arrow 28.

Figure 2:
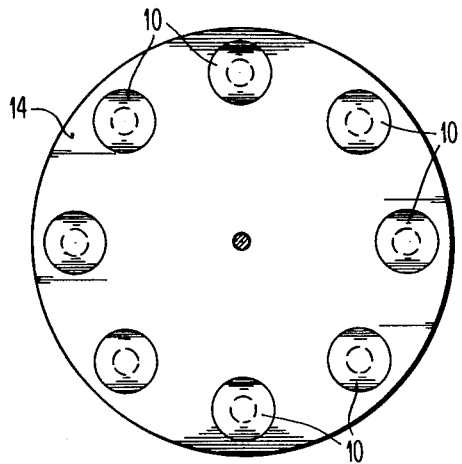
FIG. 2 is a top view of a disk supporting various crystals, which disk can be used in the apparatus according to FIG. 1.
Figure 3:
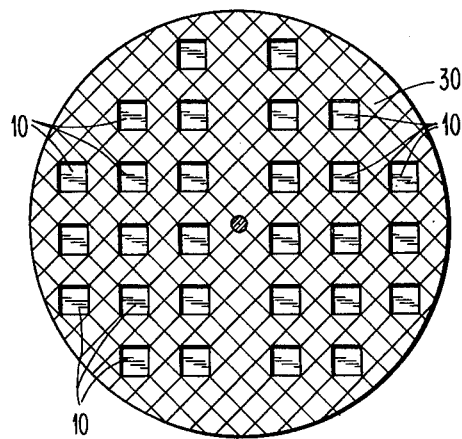
FIG. 3 is a top view of a mesh for holding various crystals, which mesh can be used in the apparatus according to FIG. 1.

It has been mentioned that the crystals 10 are suspended in the vapor 6 by means of a hanging support 12. This hanging support 12 must be able to drain off the liquid which condenses on the crystals 10. According to FIG. 2, the support 12 comprises a metal disk 14 having a plurality of supporting holes 20 therein. As is illustrated in FIG. 3, the support 12 may alternately comprise a mesh 30 on which the individual crystals 10 are placed. In FIG. 2 cylindrical crystals or crystal disks are used. In contrast to FIG. 2, the crystals 10 shown in FIG. 3 are square crystals. For instance, they may have a size of $3.25 \times 3.25 \times 1$ mm$^3$. It is understood, however, that the crystals 10 can take any physical form. In FIG. 2 the individual crystals 10 are located along a circular path, whereas in FIG. 3 the crystals 10 form a regular pattern in an orthogonal coordinate system.

The boiling point of the organic solvent 6 is selected to be at least approximately equal to the annealing temperature of the crystals 10.

When the solvent 6 evaporates, the vapor will arrive in the upper area where the cooling coil 24 is located. As a result of the cooling effect, condensation will take place. The condensed vapor will flow down along the side walls of the container 2. Vapor will also condense on the crystals 10. The solvent condensing on the crystals 10 cleans off dust, dirt, grease and other surface impurities therefrom. The condensed liquid falls back into the liquid contained in the bottom portion of the container 2. Thus, impurities like dust, dirt and grease are washed away from the crystals 10 and collected in the liquid solvent 6 at the bottom. Subsequently the condensed organic solvent 6 is again evaporated by means of the heater 8, whereby the aforementioned impurities remain in the liquid. The vapor reaching the crystals 10 and condensing thereon has the optimum pre-annealing temperature T*. This is due to the proper selection of the boiling point of the solvent 6. Since the temperature T* always remains the same during the annealing process, consistent results are achieved.

The crystals 10 may be, for instance, thermoluminescent crystalline materials such as LiF and CaF$_2$ containing or doped with well-known impurities such as rare earth ions.

After a predetermined period of time t*, the crystals 10 are removed from the housing 2. Now they are transferred into a read-out apparatus of well-known design, such as described in the brochure "Atlas Automated TL Analyzer System" by The Harshaw Chemical Company, Solon, Ohio 44139, U.S.A. This brochure also describes an indexing disk that will accommodate TLD rods, ribbons, or chips. Such an indexing disk can be used as supporting disk 14. In the read-out apparatus, the radiation response of the crystals to ionizing radiation, such as alpha, beta or gamma radiation or neutrons, is determined.

Thus, it will be noted that the method of annealing and cleaning simultaneously may not only be applied to thermoluminescence dosimeter crystals which are exposed to gamma or beta radiation, but also to neutron or alpha radiation detector crystals.

Some examples for the proper selection of crystals and solvents will be given below.

Example I: thermoluminescent crystals of lithium fluoride are processed (cleaned and annealed) at approximately 100° C. for 10 minutes.

Example II: thermoluminescent calcium fluoride crystals are processed at approximately 100° C. for 20 minutes.

Example III: thermoluminescent magnesium borate crystals are processed for 10 minutes at approximately 100° C.

Example IV: thermoluminescent crystals of calcium fluoride are processed for 10 minutes at approximately 100° C.

Example V: $^6$LiF:Mg crystals are processed at approximately 60° C. for 18 hours.

An organic solvent can be used that has an appropriate boiling point which will not damage the crystal or change the subsequent read-out. Examples are sec-butyl alcohol having a boiling point of 99.5° C. and methyl cyclohexane having a boiling point of 101° C. and ethyl tert-amyl ether having a boiling point of 101° C. These solvents can be used in the examples I to IV. The example V refers to $^6$LiF:Mg dosed with thermal neutrons. As indicated above, the optimum annealing temperature for an overnight (18 hour) anneal has been determined in the literature to be approximately 60° C. Such crystals can be exposed to vapor of dichloroethylene. The boiling point of this substance is 60.3° C.

Experiments have indicated that the boiling point of the solvent can be chosen to be within a range of ±2° C. of the optimal annealing temperature T*. These experiments have also indicated that the temperature is not critical since the annealing time t* is another parameter that has to be observed.

According to a preferred example, lithium fluoride crystals are suspended in the vapor bath of sec-butyl alcohol for at least 10 minutes. As indicated above, this alcohol has a boiling point of 99.5° C. During the suspension, the alcohol anneals as well as cleans the crystals. Subsequently, the process of reading out data with respect to determining effects of the ionizing radiation on the crystals is commenced.

While the forms of the crystal processing method and the annealing apparatus herein described constitute preferred embodiments of the invention, it is to be understood that the invention is not limited to these precise procedures and forms of assembly, and that a variety of changes may be made therein without departing from the scope of the invention.

What is claimed is:

1. A method for processing a thermoluminescent radiation detector crystal which has been irradiated by ionizing radiation, comprising the step of contacting said irradiated crystal prior to read-out thereof with an organic solvent at its boiling point for a time sufficient to clean and anneal said irradiated crystal, said boiling point being approximately equal to the optimum post-radiation annealing temperature of said crystal, said solvent thereby simultaneously cleaning and annealing said crystal.

2. The method according to claim 1, wherein said crystal is suspended in a vapor bath of said solvent.

3. The method according to claim 1, wherein said crystal is a lithium fluoride crystal which is exposed to said solvent at approximately 100° C. for at least 10 minutes.

4. The method according to claim 1, wherein said crystal is a calcium fluoride crystal which is exposed to said solvent at approximately 100° C. for at least 20 minutes.

5. The method according to claims 3 or 4, wherein said solvent is sec-butyl alcohol.

6. The method according to claims 3 or 4, wherein said solvent is methyl cyclohexane.

7. The method according to claims 3 or 4, wherein said solvent is ethyl tert-amyl ether.

8. The method according to claim 1, wherein the boiling point of said solvent is within a range of ±2° C. of said optimum annealing temperature.

9. The method according to claim 1, further comprising the step of subsequently reading out data with respect to effects of said ionizing radiation on said crystal.

10. The method according to claim 1, wherein said radiation is gamma radiation.

11. The method according to claim 1, wherein said radiation is beta radiation.

12. The method according to claim 1, wherein said crystal is the detector crystal of a thermoluminescence dosimeter.

* * * * *